United States Patent
Cheng et al.

(10) Patent No.: US 8,296,463 B2
(45) Date of Patent: Oct. 23, 2012

(54) GLOBALIZATION MANAGEMENT SYSTEM AND METHOD THEREFOR

(75) Inventors: Shang-Che Cheng, Saratoga, CA (US); Alexander Pressman, Saratoga, CA (US)

(73) Assignee: SDL International America Incorporated, Sunnyvale, CA (US)

( * ) Notice: Subject to any disclaimer, the term of this patent is extended or adjusted under 35 U.S.C. 154(b) by 0 days.

(21) Appl. No.: 13/019,980

(22) Filed: Feb. 2, 2011

(65) Prior Publication Data

US 2011/0191458 A1   Aug. 4, 2011

Related U.S. Application Data

(63) Continuation of application No. 10/003,315, filed on Dec. 6, 2001, now Pat. No. 7,904,595.

(60) Provisional application No. 60/262,073, filed on Jan. 18, 2001.

(51) Int. Cl.
  *G06F 15/16* (2006.01)
  *G06F 17/00* (2006.01)
  *G06F 17/20* (2006.01)

(52) U.S. Cl. .............................. 709/246; 704/8; 715/264

(58) Field of Classification Search .................. 709/246; 715/264; 704/8
See application file for complete search history.

(56) References Cited

U.S. PATENT DOCUMENTS

| | | | |
|---|---|---|---|
| 5,075,850 A | 12/1991 | Asahioka | |
| 5,295,068 A | 3/1994 | Nishino | |
| 5,477,451 A | 12/1995 | Brown | |
| 5,497,319 A * | 3/1996 | Chong et al. | 704/2 |
| 5,644,775 A | 7/1997 | Thompson | |
| 5,675,802 A | 10/1997 | Allen et al. | |
| 5,751,957 A | 5/1998 | Hiroya | |
| 5,813,007 A | 9/1998 | Nielsen | |
| 5,884,097 A | 3/1999 | Li et al. | |
| 5,884,246 A | 3/1999 | Boucher | |
| 5,894,554 A | 4/1999 | Lowery et al. | |
| 5,895,446 A | 4/1999 | Takeda | |
| 5,966,685 A | 10/1999 | Flanagan | |
| 5,978,828 A | 11/1999 | Greer et al. | |
| 5,987,401 A | 11/1999 | Trudeau | |
| 6,026,413 A | 2/2000 | Challenger et al. | |

(Continued)

OTHER PUBLICATIONS

Idiom, Inc."WorldServer 2 White Paper", released 2000, 19 pages.

(Continued)

*Primary Examiner* — George C Neurauter
(74) *Attorney, Agent, or Firm* — Carr & Ferrell LLP

(57) ABSTRACT

A globalization management system (200) for managing resources of multiple interrelated data sources (1021, 1022, 1041, 1042, 1000, 1200, 1002, 1202) corresponding to a plurality of sites (102, 104, 106) accessed through a communications network (20) is provided. The globalization management system (200) includes a plurality of target application interfaces (222) respectively coupled to the interrelated data sources through the communications network. Each target application interface (222) includes systems (212, 214, 216, 218) for converting a protocol of the respective data source to a predetermined protocol, and the predetermined protocol to the protocol of the respective data source. The globalization management system (200) further includes a global management engine (100) coupled to the plurality of target application interfaces (222). The global management engine (100) includes a site-to-site relationship manager, a system for reading data representing current content from the interrelated data sources, a system for comparing the data representing current content with data representing prior content, and a project manager for transferring the data identified as a content change to at least one of the interrelated data sources that has been identified as a subscriber site.

16 Claims, 18 Drawing Sheets

U.S. PATENT DOCUMENTS

| | | | |
|---|---|---|---|
| 6,041,333 | A | 3/2000 | Bretschneider et al. |
| 6,041,360 | A | 3/2000 | Himmel et al. |
| 6,092,035 | A | 7/2000 | Kurachi |
| 6,108,703 | A | 8/2000 | Leighton et al. |
| 6,122,666 | A | 9/2000 | Beurket et al. |
| 6,128,652 | A | 10/2000 | Toh et al. |
| 6,128,655 | A | 10/2000 | Fields et al. |
| 6,161,082 | A | 12/2000 | Goldberg |
| 6,163,785 | A | 12/2000 | Carbonell |
| 6,216,212 | B1 | 4/2001 | Challenger et al. |
| 6,219,818 | B1 | 4/2001 | Freivald et al. |
| 6,256,712 | B1 | 7/2001 | Challenger et al. |
| 6,263,332 | B1 | 7/2001 | Nasr |
| 6,278,969 | B1 | 8/2001 | King |
| 6,330,566 | B1 | 12/2001 | Durham |
| 6,338,033 | B1 | 1/2002 | Bourbonnais |
| 6,347,316 | B1 | 2/2002 | Redpath |
| 6,356,903 | B1 | 3/2002 | Baxter et al. |
| 6,363,337 | B1 | 3/2002 | Amith |
| 6,401,105 | B1 | 6/2002 | Carlin |
| 6,438,540 | B2 | 8/2002 | Nasr |
| 6,477,575 | B1 | 11/2002 | Koeppel et al. |
| 6,526,426 | B1 | 2/2003 | Lakritz |
| 6,623,529 | B1 | 9/2003 | Lakritz |
| 6,725,333 | B1 | 4/2004 | Degenaro et al. |
| 6,748,569 | B1 | 6/2004 | Brooke |
| 6,782,384 | B2 | 8/2004 | Sloan |
| 6,973,656 | B1 | 12/2005 | Huynh et al. |
| 2002/0007383 | A1 | 1/2002 | Yoden et al. |
| 2002/0178166 | A1 | 11/2002 | Hsia |
| 2007/0208991 | A1 | 9/2007 | Rider |

OTHER PUBLICATIONS

Market Wire. "VerticalNet Selects Uniscape as Globalization Provider to Speed Global Expansion," Jun. 2000, <www.findarticles.com/p/articles/mi_pwwi/is_200006/ai_mark01011558/print>, 2 pages.

PRNewsWire and NEWSdesk. "Personify Selects Uniscape to Enable Ebusiness Solutions for Global Markets," Aug. 30, 2000, <www.findwealth.com/personify-selects-uniscape-to-enable-180593pr.html>, 2 pages.

Uniscape, Inc. "Uniscape, Inc. Home Page," publicly posted Feb. 20, 1999, <web.archive.org/web/19990220195249/http://www.uniscape-inc.com/>, 2 pages.

Business Wire. "Uniscape Introduces Pilot Program to Provide Multilingual Website Management Solutions," Feb. 11, 1999, <www.findarticles.com/p/articles/mi_m0EIN/is_1999_Feb_11/ai_53852378>, 1 page.

Business Wire. "Uniscape Announces New Solution for Automating Management of Software Localization Process," Aug. 17, 1998, <www.findarticles.com/p/articles/mi_m0EIN/is_1998_August_17/ai_21090247>, 2 pages.

Market Wire. "Cephren Relies on Uniscape During Rapid Global eBusiness Expansion," Oct. 18, 2000, <www.marketwire.com/mw/iwpr?id=18115&cat=te>, 2 pages.

"The GNU Make Manual", Version 3.79, edition 0.55, Apr. 2000, Free Software Foundation, Inc., 137 pages.

Rational Software Corporation, "Introduction to ClearCase", Dec. 1999, Rational ClearCase, Release 4.0., 78 pages.

Rational Software Corporation, "Administering ClearCase", Rational ClearCase Release 4.0, 1999, 419 pages.

Challenger et al., "A Scalable System for Consistently Caching Dynamic Web Data", INFOCOM '99. Eighteenth Annual Joint Conference of the IEEE Computer and Communications Societies. Proceedings. IEEE, Mar. 21-25, 1999, pp. 294-303, vol. 1, 10 pages.

Challenger et al., "A Publishing System for Efficiently Creating Dynamic Web Content", INFOCOM 2000. Nineteenth Annual Joint Conference of the IEEE Computer and Communications Societies. Proceedings. IEEE, Mar. 26-30, 2000, vol. 2, 10 pages.

Croll et al., "Content Management—The Users Requirements", International Broadcasting Convention, Conference Publication No. 447, Sep. 12-16, 1997, 4 pages.

My Yahoo—RSS Headlines Module—"Frequently Asked Questions," Jan. 24, 2004, <http://web.archive.org/web/20040124175747/http://my.yahoo.com/s/rss-f aq. html> accessed on Dec. 17, 2008, 4 pages.

Krishnan, "Unmittelbare Ergenbnisse Noch Schneller: Google Vorschau—Der Google Produkt-Kompass," Nov. 9, 2010, <http://web.archive.org/web/20101109154340/http://google-produkt-kompass.blogspot.com/2010/11/unmittelbare-ergebnisse-nochschneller.html> accessed on Apr. 4, 2012, 2 pages.

Unidex, Inc.: "XML Convert," Aug. 4, 2007, <http://www.unidex.com/xflat.htm> accessed on Apr. 5, 2012, 1 page.

Wikipedia—"SOAP," Jan. 22, 2011, <http://en.wikipedia.org/w/index.php?title=SOAP&oldid=409349976> accessed on Apr. 4, 2012, 5 pages.

Mutz et al., "User-Agent Display Attributes," HTTP Working Group, Nov. 26, 1996, 6 pages.

XP007905525, The Technical Aspects Identified in the Present Application (Art. 15 PCT) are considered part of common general knowledge. Due to their notoriety no documentary evidence is found to be required. Official Journal Nov. 2007, p. 592.

\* cited by examiner

GLOBALIZATION MANAGEMENT SYSTEM AND METHOD THEREFOR

CROSS-REFERENCES TO RELATED APPLICATION

The present application is a continuation of and claims the priority benefit of U.S. patent application Ser. No. 10/003,315 filed Dec. 6, 2001 and titled Globalization Management System and Method Therefor which claims priority to U.S. provisional patent application No. 60/262,073 filed Jan. 18, 2001 and titled Globalization Management System and Method Therefor. The disclosure of the foregoing is incorporated herein by reference.

BACKGROUND OF THE INVENTION

1. Field of the Invention

This invention directs itself to a system for managing the resources defined as code, content and graphics, of multiple interrelated and multilingual web sites. Further, this invention directs itself to a method for automatically updating the resources of web sites identified as subscribers responsive to changes in a resource on one or more source or provider sites. More in particular, this invention is directed to a system which provides the infrastructure for managing the deployment of multilingual resources across a network of globalized web sites. Still further, this invention provides a method for coordinating resources and managing globalization activity updates across multiple, multilingual web sites. Still more in particular, this invention provides the means to detect changes throughout a client's network of globalized web sites, automatically triggers localization of a global resource according to predetermined schedules, processes and customer-defined business rules, and then updates the subscriber sites with the updated resources, directly, translated, or in a localized form.

2. Prior Art

Content management systems are known in the art. Heretofore, such systems, such as provided by VIGNETTE, INTERWOVEN, DOCUMENTUM, and others provided the means to manage the creation of content and resources for web site content for a particular site. However, such systems could not integrate a globalized network of web sites having non-uniform interrelationships therebetween.

The present invention overcomes the limitations of the prior art by providing a globalization management system that complements existing content management systems to handle global content changes or updates with a minimum of manual intervention. Yet, the globalization management system of the present invention allows for defining the relationships between a company's multiple multilingual web sites, as well as additions and deletions of web sites. Additionally, the resources which are monitored can be added to, deleted, as well as provide for editing of tasks associated with various types of content.

SUMMARY OF THE INVENTION

A system for managing the resources of multiple interrelated and multilingual web sites is provided. The system provides for automatic detection of updates at particular web sites, identifies the resource as requiring translation, or other changes, such as localization, and transfers the resource, in its translated or localized form to identified subscriber web sites. The system provides the means for managing complex interrelationships between multiple web sites of u user, which may be multilingual, or may cater to an audience requiring a particular presentation format or resource.

DESCRIPTION OF THE PREFERRED EMBODIMENT

Figure 1:
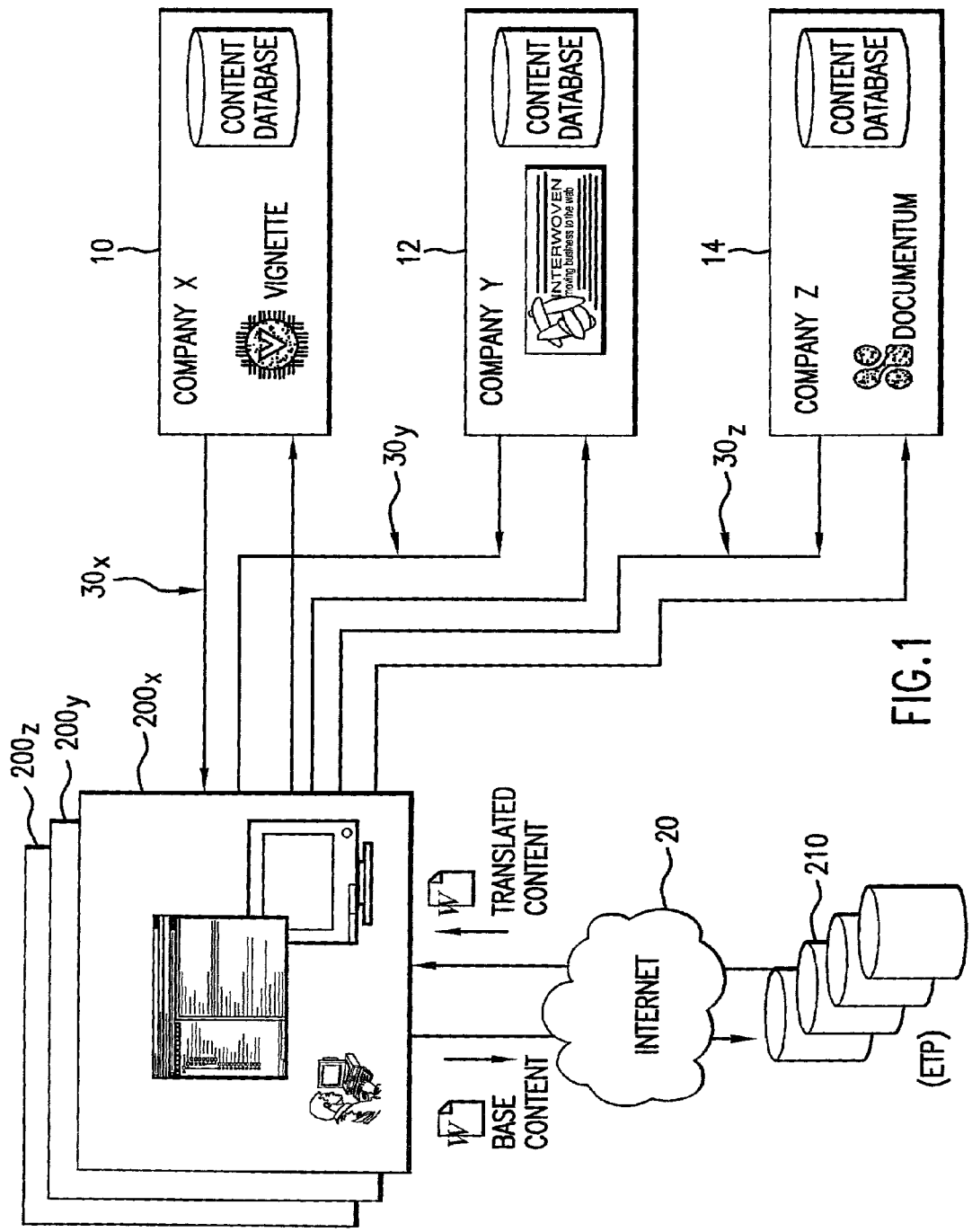
FIG. 1 is a block diagram illustrating applications of the globalization management system of the present invention.

A system for managing the resources of multiple interrelated web sites is provided to provide automatic detection of resource updates at particular web sites, identified as resource providers, transferring the updates to other sites, identified as subscribers, wherein the transferred resource may be translated and/or localized, as required. As illustrated in FIG. 1, each entity, company X, Y, and Z, is provided with a globalization management system 200x, 200y, 200z, respectively. Each of the company's web server systems (web servers) 10, 12, 14 communicates through a respective Intranet 30x, 30y, 30z with the globalization management system 200x, 200y, 200z. The globalization management system 200x, 200y, 200z has the ability to interface with the local resource management/database system used within the web servers 10, 12 14, whether it is a VIGNETTE system, INTERWOVEN system, DOCUMENNTUM, or others. When web page content requires translation for use in one of the company's foreign language web sites, the globalization management system 200x, 200y, 200z communicates with an electronic translation portal (ETP) 210 through a global computer network (Internet) 20. Thus, the system provides the means by which multilingual and multi-site web-site globalization can be efficiently and substantially automatically managed.

Figure 2:
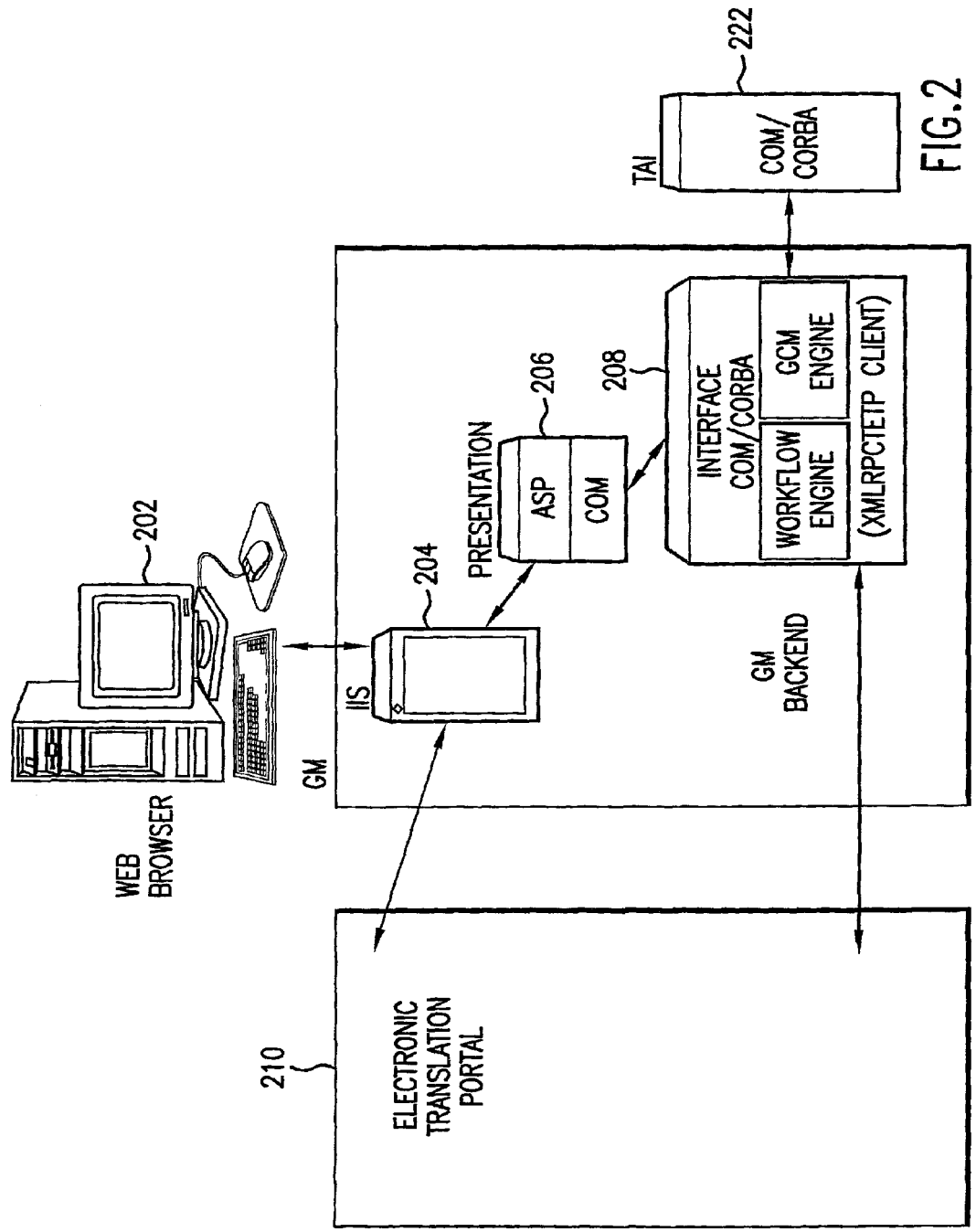
FIG. 2 is a more detailed block diagram of the present invention.

A more detailed view of the globalization management system is further illustrated in FIG. 2. An individual responsible for administration of a company's web sites communicates with the global contact management system utilizing a terminal 202 utilizing web browser software. The terminal 202 communicates with a server 204 which receives data from the agent 208. Agent 208 communicates through the Internet with the electronic translation portal 210 as well as a remote target application interface 222, which is considered a backend data source for the system. Data being transmitted to server 204 from agent 208 is in the form of presentation 206, which is much like a web page. An active server pages (ASP) or Java server pages (JSP) template is utilized to collect information from the database and create the page 206 which is presented to the server 204 for transmission to the terminal 202, or alternately, to the electronic translation portal 210, through the Internet, in order to have that information translated for the operator of terminal 202.

Figure 3:
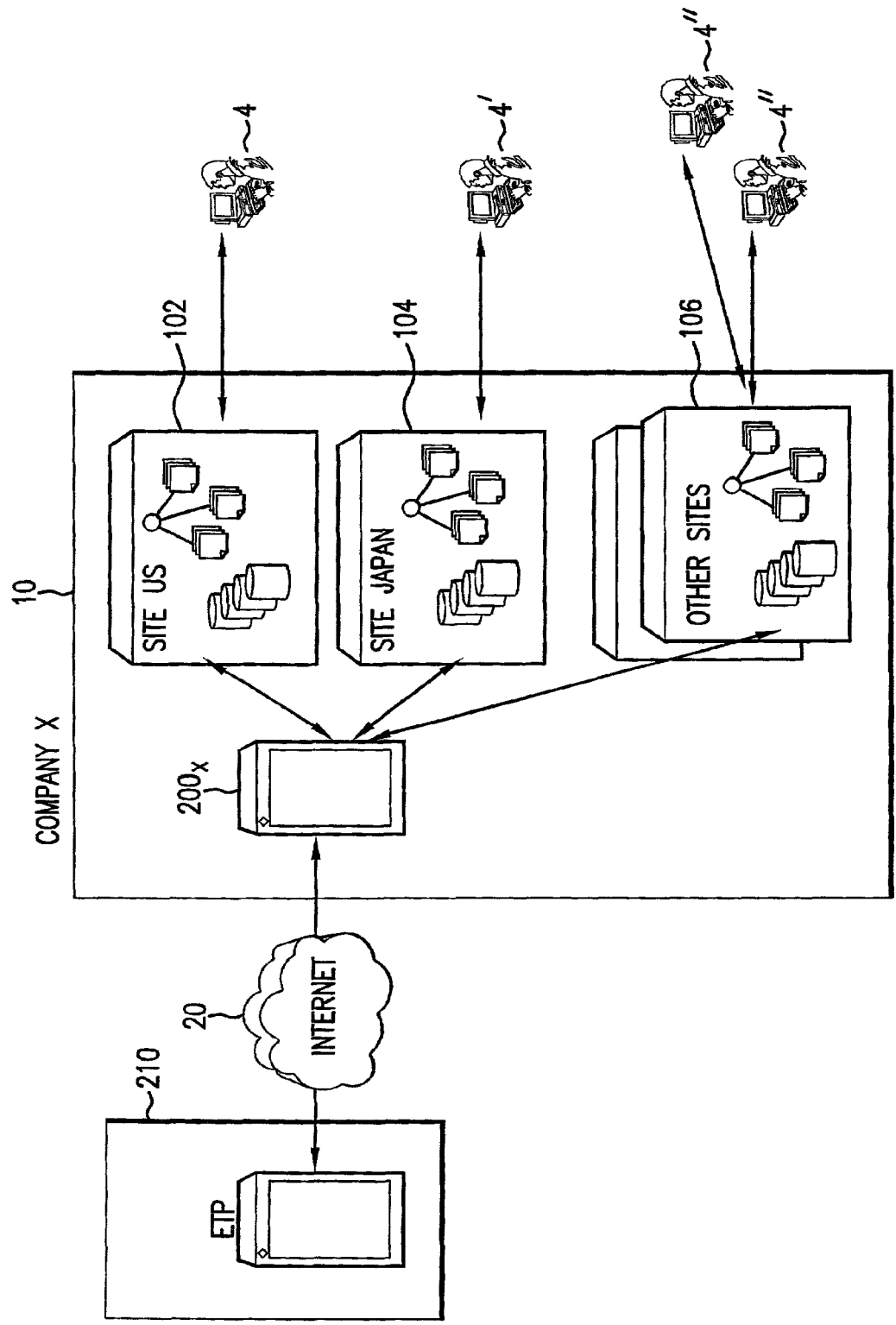
FIG. 3 is a diagram illustrating an application of the present invention.

In use, as shown in the diagram of FIG. 3, a Company X has a web server 10 which provides a web site 102 in the United States, a web site 104 in Japan, and at least one other web site 106 in another country. The globalization management system 200x maintains the resource relationships between the multiple sites by automatically updating, translating and localizing the data added to those sites identified as resource providers for incorporation in the subscriber sites. In the following example, Company X is a widget manufacturer with its primary site 102 created in English. Utilizing the electronic translation portal 210 through the Internet 20 one or more resources of the U.S. site 102 is translated into Japanese for use on the Japanese site 104 and French, for the site 106. Company X has manufacturing plants in the U.S., Japan and France, and therefore each of the respective web sites 102, 104 and 106 is identified as a provider for the other sites, which also therefore act as subscribers. For instance, if the Company's Japanese site posts an article dealing with possible changes in Japan's laws concerning how widgets are manufactured or sold in that country, that information may be important to widget production and imports/exports in the United States and France. Therefore, with the Japanese site acting as provider, the globalization management system 200x will identify the newly posted article on the Japanese site, transmit that resource to the electronic translation portal 210, and upon returned receipt of the translated resource, globalization management system 200x will then update the U.S. and French sites appropriately. In other cases, wherein content is strictly local, such as pricing or sales associated with locally observed holidays, no provider/subscriber relationship will exist for that content and an update in pricing on the French site will not affect any content on either the U.S. or Japanese sites. Thus, the globalization management system 200x allows the subscription and provider relationships between the sites to be set up at different granularities such that items as small as individual paragraphs in a file and as large as entire web sites can have resources copied, translated and localized. Localization is the adaptation of shared web site resources from the resource provider to the subscriber to conform to the local culture and business customs of the subscriber locale. In addition to such content as product pricing, content relating to holiday promotions or containing particular colloquialisms will need adaptation for local sites, rather than direct translation. Although each of the web sites 102, 104, 106 includes local content editors and reviewers 4, 4', 4", use of the globalization management system 200x takes care of the problem of updating one site with respect to changes made at one of the others.

Figure 4:
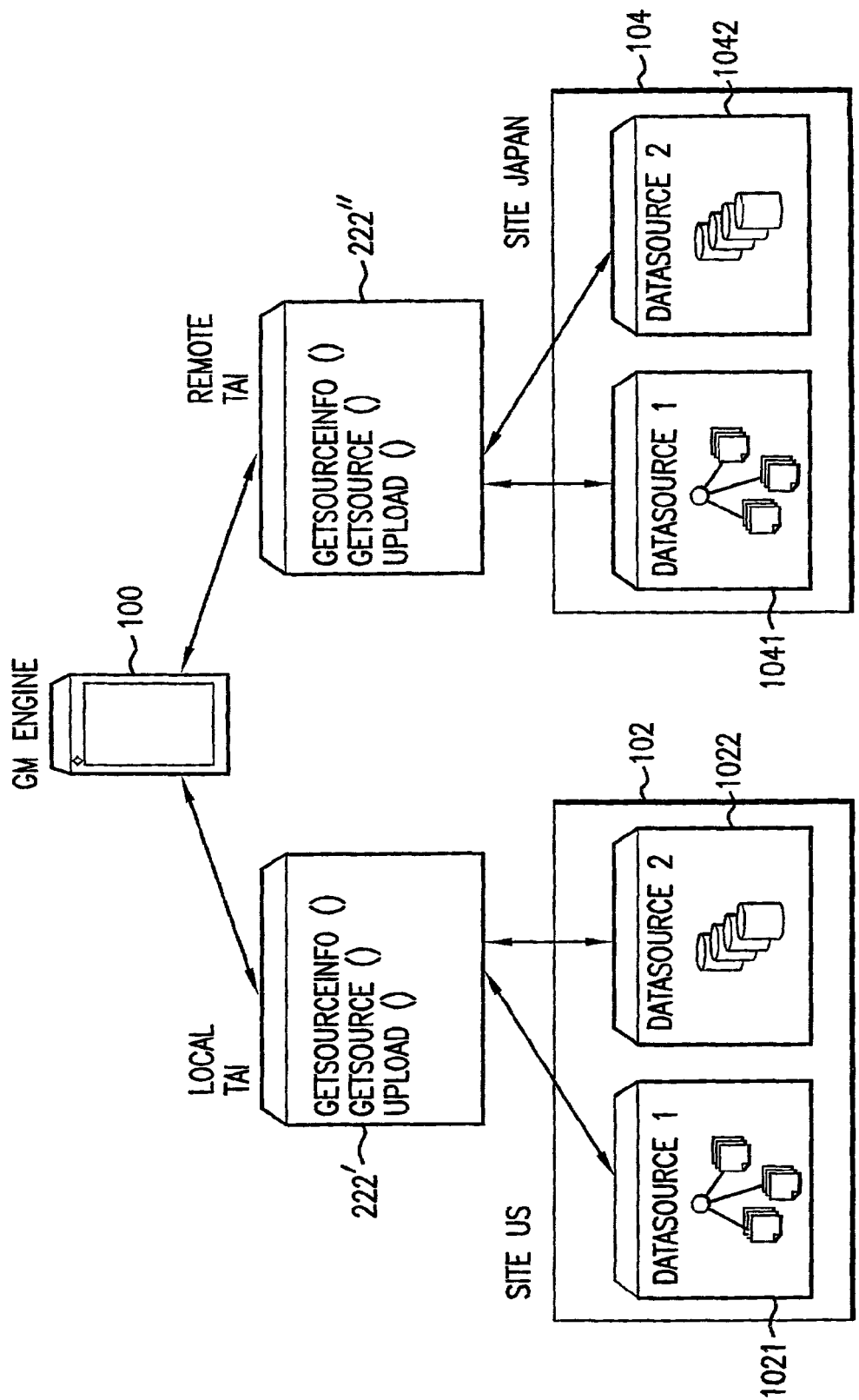
FIG. 4 is a block diagram representing the data flow within the present invention.

Turning now to FIG. 4, there is shown the block diagram representing the data flow within the globalization management system. The globalization manager engine 100 communicates with the data sources of the U.S. and, for example, the Japanese web sites through a local target application interface (TAI) 222' and a remote target application interface 222", respectively. Each of the respective interfaces 222', 222" has an open architecture for communicating with the data sources 1021 and 1022 used by the web site 102 and data sources 1041, and 1042, used by the web site 104, respectively. Thus, wherein the Japanese web site is in English, and therefore no translation is needed, the globalization manager engine 100 is able to identify changes in a resource, and appropriately transfer such from one data source of one web site to a data source of another.

Figure 5:
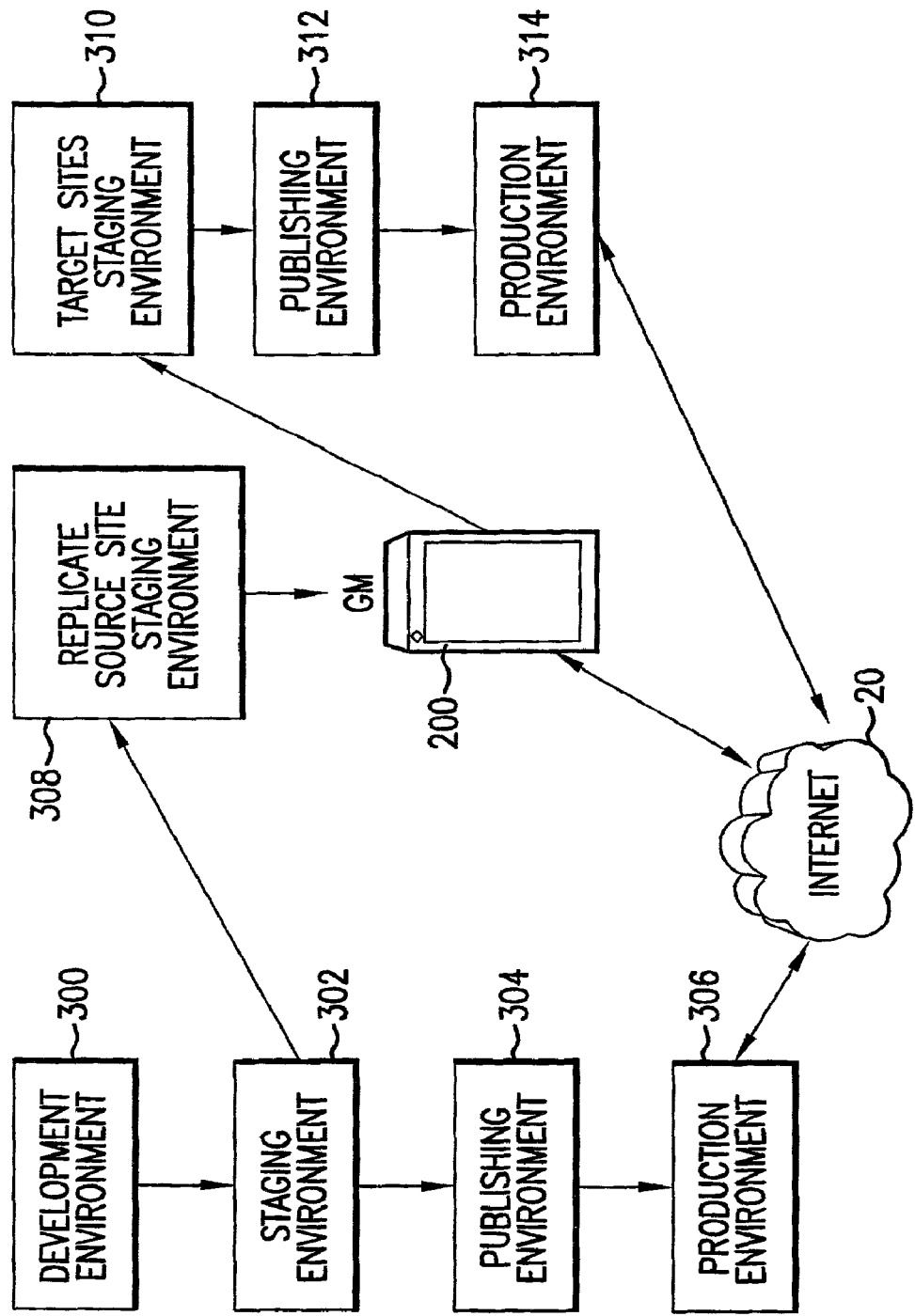
FIG. 5 is a flowchart illustrating the present invention's resource staging scheme of the present invention.

In FIG. 5, the globalization management system's resource staging scheme is shown. Web site resources are created by individuals. The creation of a resource goes through a number of stages, beginning with the development environment 300 wherein web site form and resources evolve. From the development environment, there is next a staging environment wherein the resource is prepared and arranged. From the staging environment 302, the resource may be then published, from which it then goes to the production environment 306. The globalization management system 200 can replicate any of those environments, pulling resources from the development environment, staging environment, publishing environment or production environment. Thus, the replication can take place in any of blocks 308, 310, 312 or 314, depending on the user's desires. The source and target environments are a function of such characteristics as the language of the resource and the culture into which it is targeted. Consider, a web site which has been developed in French for the culture in France which must then be replicated, to a certain degree, for use in Quebec, Canada. Although the language need not significantly change, there are significant cultural differences which may affect the content.

Figure 6:
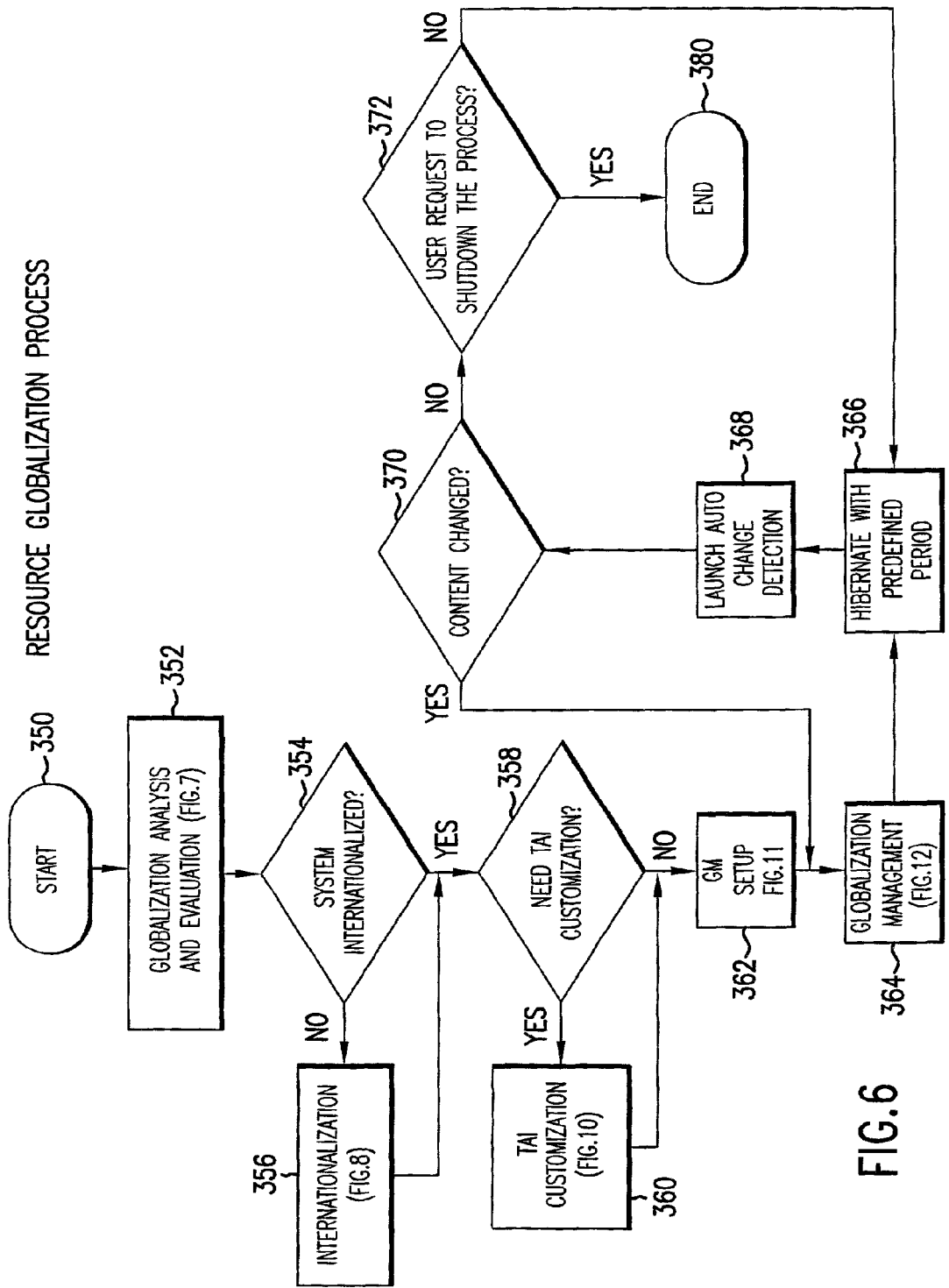
FIG. 6 is a flowchart illustrating the resource globalization process of the present invention.

The flow chart in FIG. 6 will aid in understanding the process of resource globalization. Beginning from the start block 350, the process begins with a globalization analysis and evaluation in block 352. That process is further defined in FIG. 7, and will be discussed in following paragraphs. From block 352, the flow passes to decision block 354 wherein it is determined whether the user's content management system needs to be internationalized (able to handle multiple languages). If it requires internationalization, the flow passes to block 356 (further defined in FIG. 8). Subsequent to internationalization, the flow passes from block 356 to decision block 358. If internationalization was not required, flow passes from decision block 354 to decision block 358. In block 358 it is determined whether target application interface customization is required. Target application interface customization deals with the selection of data sources from which the resource is derived, and if customization is required, the flow moves to block 360, which process is further defined in FIG. 10. Subsequent to customization, the flow passes to the global content manager setup procedure identified in block 362. If target application interface customization was not required, the flow passes from block 358 to block 362. The globalization manager setup of block 362 deals with configuration and initialization of a number of subprocesses that are further illustrated in FIG. 11.

From block 362, the flow then passes to block 364 which describes the management steps involved with management of global resources. From block 364, the flow passes to block 366 wherein the system hibernates, goes to sleep for a predetermined period. By waiting a predetermined time period, the system is allowing time for a resource to be changed on the source site(s). The time period could be in terms of minutes, hours, days, weeks, etc., whatever would be a reasonable cycle time for the type of web site, and/or business associated with the web site, that is the content source. After that predetermined time period, the flow then passes to block 368 wherein auto change detection is launched, and flow then passes to decision block 370. In block 370, it is determined whether there has been a change in content on the source site. If there has been a change, flow passes back to block 364 for managing that change. If no change has been detected, flow passes to decision block 372 where it is determined whether the user has requested the process to be shut down. If the process has not been requested to shut down, flow passes back to block 366 to await the next cycle. If the user has requested the shutdown of the process, flow passes to end block 380.

Figure 7:
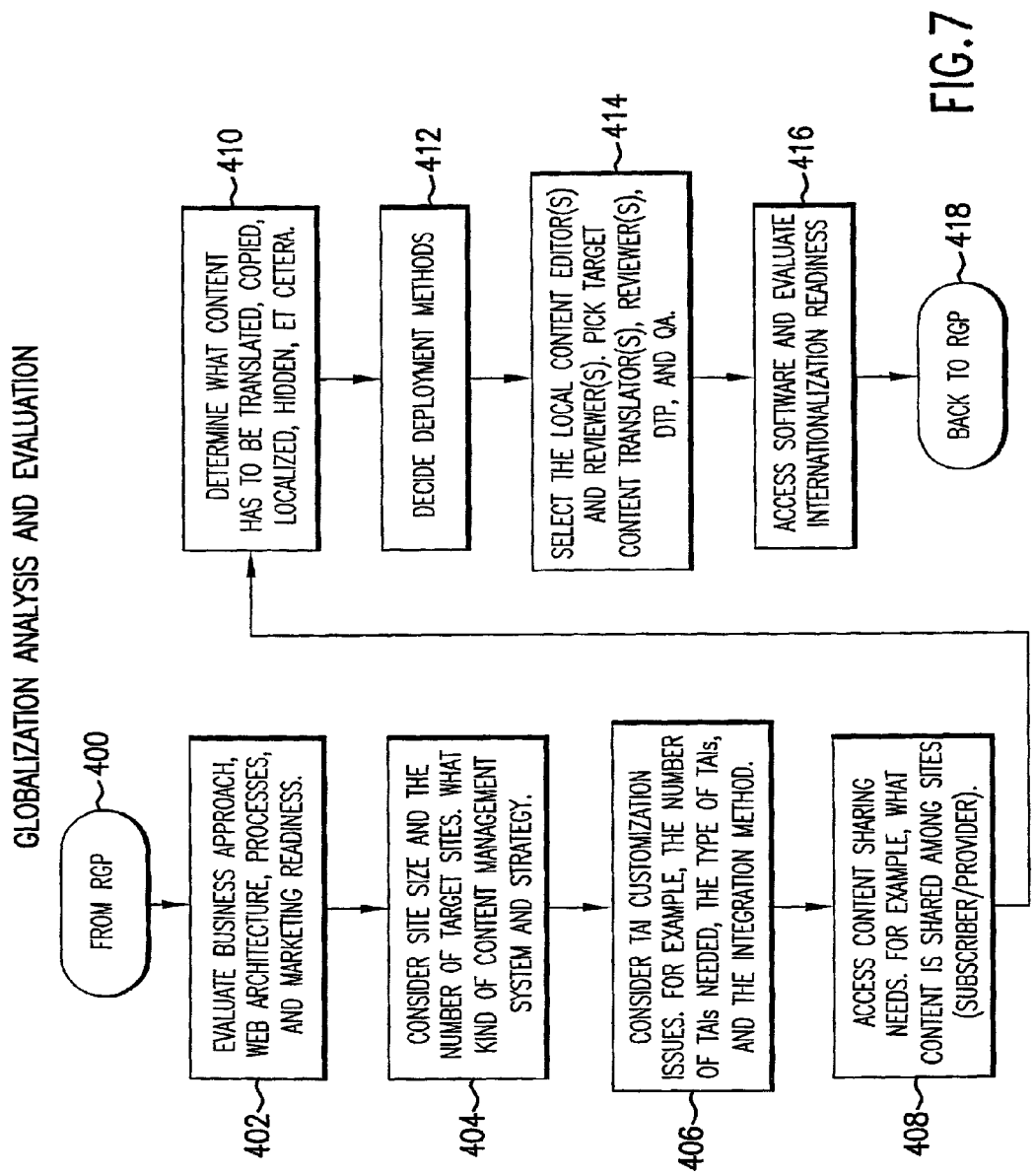
FIG. 7 is a flowchart illustrating the globalization analysis and evaluation process of the present invention.

The steps involved in the globalization analysis and evaluation, block 352 of FIG. 6, are outlined in the flow chart of FIG. 7. From the resource globalization process, indicated at block 400, the flow passes to block 402 wherein the customer's business approach, web architecture, processes and marketing readiness are analyzed and evaluated. From block 402, the flow passes to block 404, wherein it is determined the size of the web site and the number of target sites which the customer is to have, and in what countries they will reside. In block 404, it is determined what type of company management systems are to be used and whether those systems are going to use their own native file format or whether they are going to integrate with other file formats or any other content management systems. From block 404, the flow passes to block 406. In block 406, it is determined how many target applications will be needed to be created or supported, the type of target application interfaces needed, the integration method and the type of databases to be utilized as well. From block 406, the flow passes to block 408 wherein the interrelationships between sites is defined. For example, the U.S. site will subscribe resources into the Japanese site and some resource of the Japanese site may be subscribed to the U.S. site.

From block 408, the flow passes to block 410 wherein it is determined which resource needs to be translated, which resource needs to be copied directly, and which content needs to be localized, or handled in some special manner or in accordance with particular business rules. From block 410, the flow passes to block 412 where it is decided how the system is to be deployed. For example, the customer can use any file management system or word processing system to deploy it, or they may use the content management system to deploy it. From block 412, the flow passes to block 414. In block 414, the local content editor, reviewer and translator are chosen. Those functions may be handled by individuals such as company employees, outside companies or contractors, or software packages which handle the function. From block 414, the flow passes to block 416, wherein the customer's software is accessed and evaluated as to its internationalization readiness, such as handling multilingual input and/or output, different currencies, multiple time zones, etc. From block 416, the flow passes to block 418, wherein the flow is returned to block 352 of FIG. 6.

Figure 8:
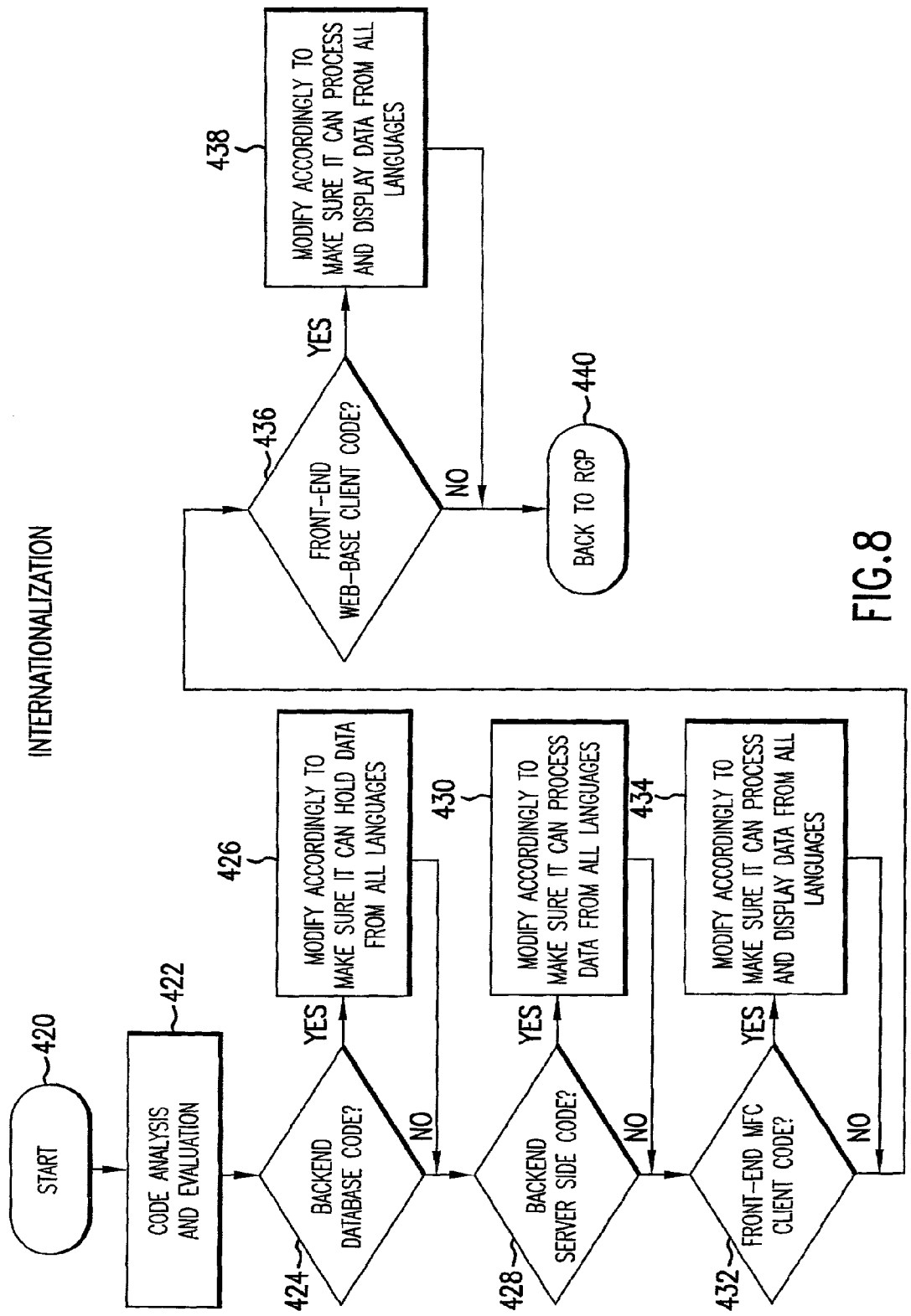
FIG. 8 is a flowchart illustrating the interim nationalization process of the present invention.

In FIG. 8, the process for internationalization is shown. Beginning from start block 420, the flow passes to block 422 in which the customer's source code is analyzed and evaluated. That evaluation includes an analysis of the language utilized, the ability to handle different currencies and data information peculiar to any particular locale. In addition to the operating software, the user's databases are also checked to make sure they are ready and able to store data coming from worldwide sources. From block 422, the flow passes to decision block 424, wherein it is determined whether the database code needs to be changed. It is important that the database be a unicode database, one which can accept data in all languages. If any database is not a unicode database, the flow passes to block 426, wherein the database is modified accordingly. From block 426 the flow passes to decision block 428, as does the flow from decision block 424 if no modification is required to the database. In block 428, it is determined whether the application server code, which may be JAVA, C++ or C, or any other program language, is able to process data from any of the different languages being supported by the multiple web site architecture. If the application server code requires modification, the flow passes to block 430 for such modification. If no modification is required, flow passes from decision block 428 to decision block 432. Likewise, subsequent to modification in block 430, the flow then passes to decision block 432.

In decision block 432, it is determined whether the client application, i.e. WINDOWS client, UNIX client, etc. can display the local information properly. If it cannot, and requires modification, the flow then passes to block 434 wherein it is modified accordingly. If no modification is required, the flow passes from decision block 432 to decision block 436. If modification was required, the flow passes from block 434 to decision block 436. In decision block 436, the client's front end web-based client code is checked to ensure that it is internationally ready. If modification is required, flow passes to block 438, wherein the modifications are made so that the front end web-based client software can process and display data from all of the required languages. If no modification is required, or subsequent to such modification, the flow passes to block 440, wherein the flow returns to block 356 of FIG. 6.

Figure 9:
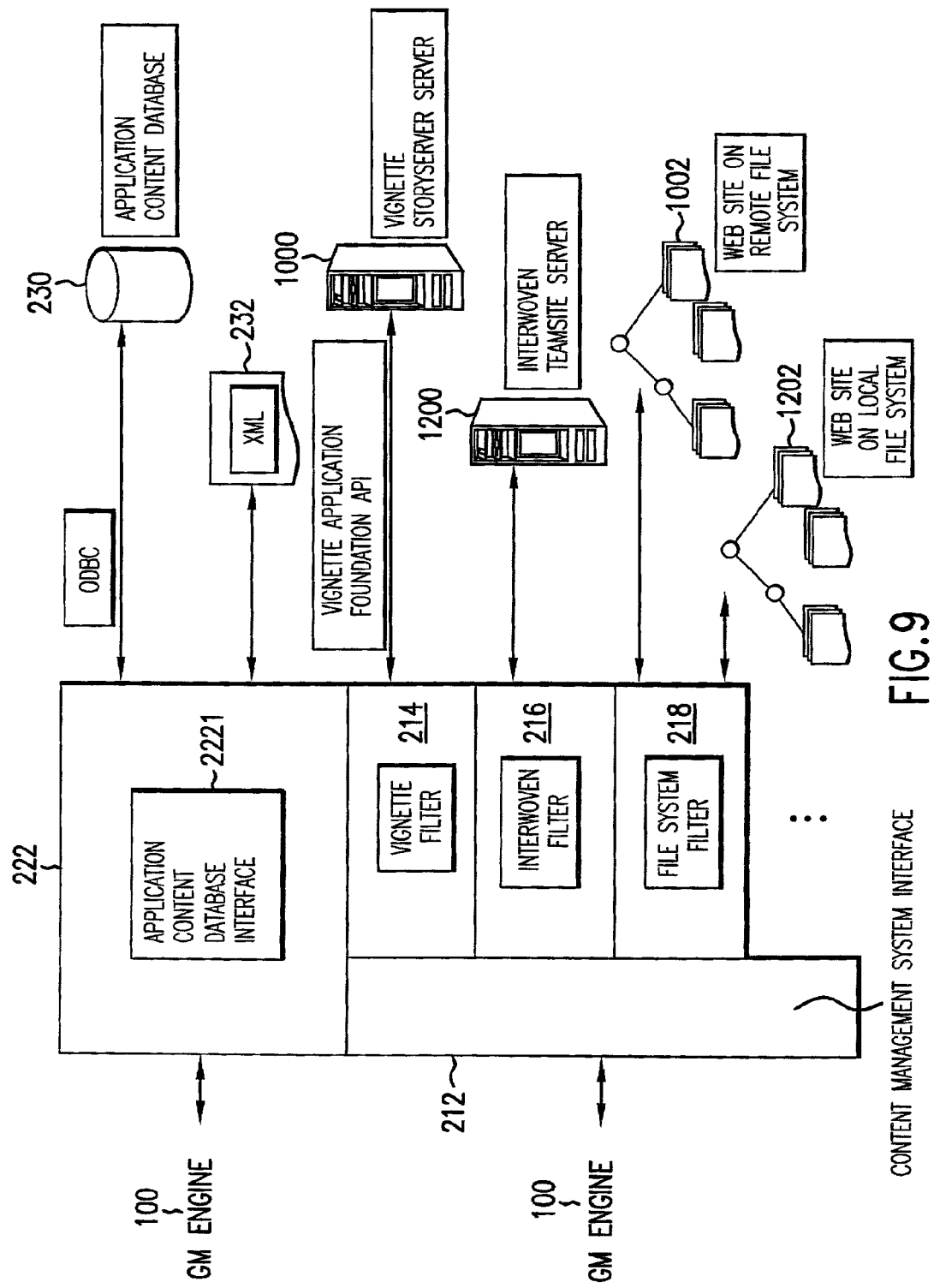
FIG. 9 is a block diagram illustrating the target application interface architecture of the present invention.

The architecture of the target application interface is shown in the block diagram of FIG. 9. The target application interface 222 communicates with the globalization manager engine 100, which accesses the application content database interface 2221. The application content database interface accesses ("talks to") the target (customer's) application content database 230, in which database the customer's web page content resides. In this manner, the globalization manager engine 100, through the application content database interface 2221 and using an appropriate driver, such as Java Database Connectivity (JDBC) or Open Database Connectivity (ODBC), pulls out the customer's web page content, checks it, and is able to make changes thereto. The application content database interface 2221 also provides an interface with an XML data source 232 for transfer of information to the globalization manager engine 100. The target application interface 222 also includes the means to talk to any content management system, such as through the filters 214, 216 and 218, which respectively provide an interface between the VIGNETTE story server 1000, the Interwoven server 1200, and remote web site file system 1002 and web site local file system 1202. The data received through the filters 214, 216 and 218 is supplied to the globalization manager engine 100 through a content management system interface 212.

Figure 10:
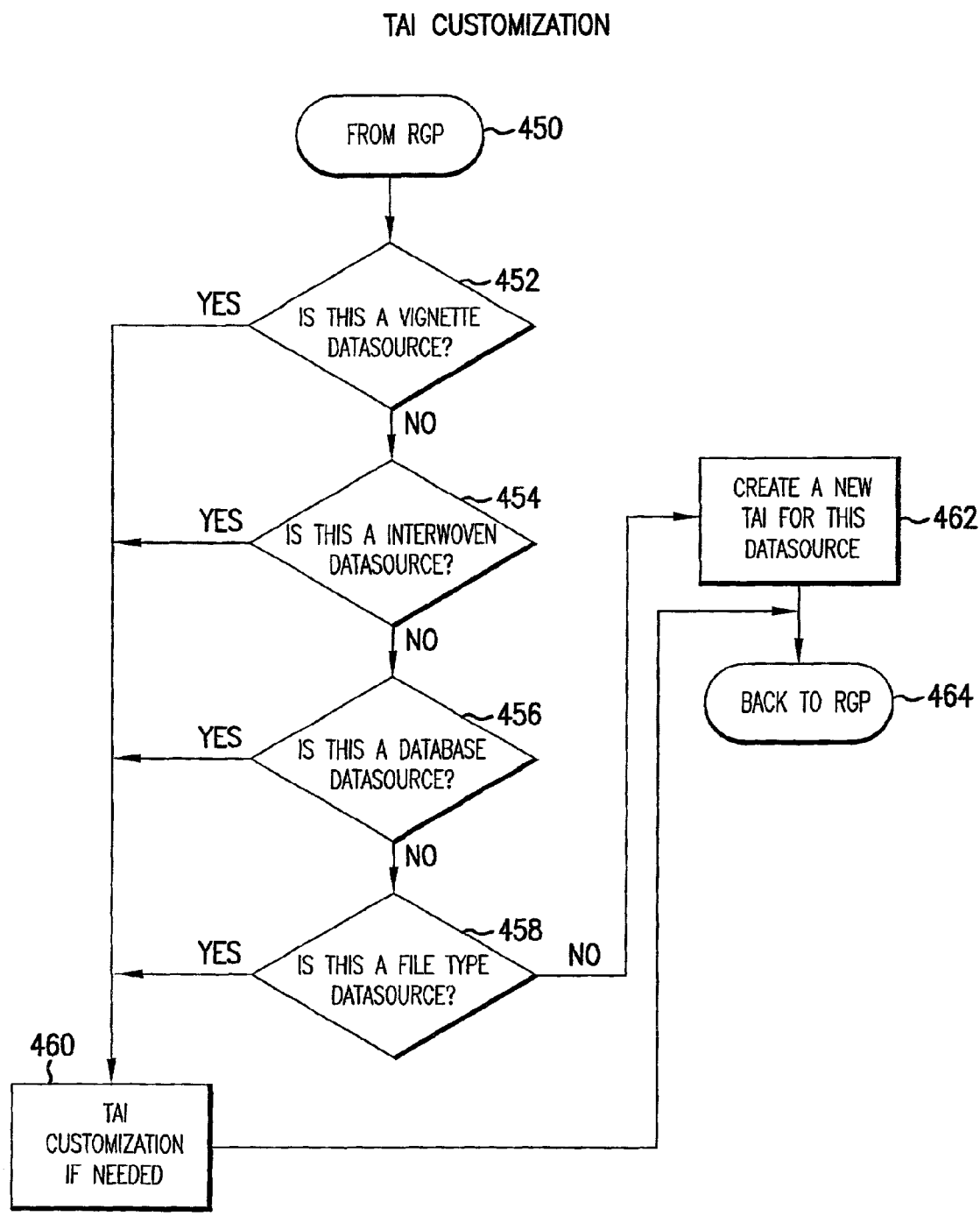
FIG. 10 is a flowchart illustrating the target application interface customization process of the present invention.

Referring now to the flow chart representing the target application interface customization process in FIG. 10, the flow passes from the starting point 450 to the decision block 452. Decision block 452 determines whether the data source is of the Vignette type. If it is, the flow passes to block 460 wherein any target application interface customization is provided, if needed. If it is not a Vignette data source, the flow passes to decision block 454 wherein it is determined whether the data source is an Interwoven type. If the data source is an Interwoven type, the flow passes to block 460. If it is not an Interwoven data source, the flow passes to block 456, wherein it is determined whether the data source is a database. If the data source is a database, the flow passes to block 460, otherwise, the flow passes to decision block 458. Decision block 458 determines whether the data source is a file. If the data source is a file, flow passes to block 460. If it is not a file type, the flow passes to block 462, since the data must be a new type of data source, the flow not having been previously diverted to block 460, and therefore requires the creation of a new target application interface for that data source. From block 460, and block 462, the flow passes to block 464, wherein the process is returned to block 360 of FIG. 6.

Figure 11:
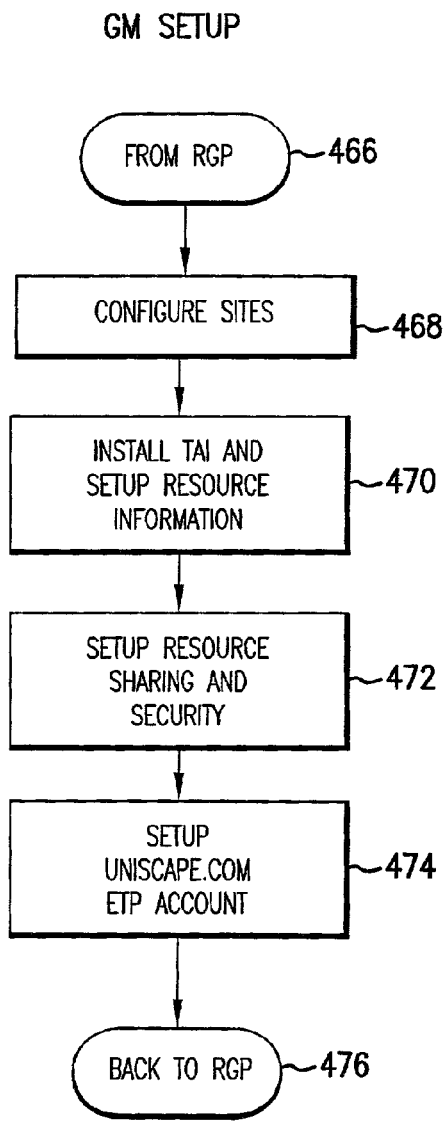
FIG. 11 is a flowchart illustrating the globalization management set-up process of the present invention.

In FIG. 11, the steps involved in the setup of the globalization manager are shown. From the starting point at block 466, the flow passes to block 468 wherein the multiple customer web sites are all configured and the GM server. From block 468, the flow passes to block 470 wherein the target application interface is installed and the resource information is set up. From block 470, the flow passes to block 472. In block 472, the resource sharing and security parameters are set up. From block 472, the flow passes to block 474 wherein the electronic translation portal account is set up so that automated translation processing can be accomplished. One such electronic translation portal is found a www.uniscape.com. From block 474, the flow passes to block 476, wherein the processing is returned to block 362 of FIG. 6.

Figure 12:
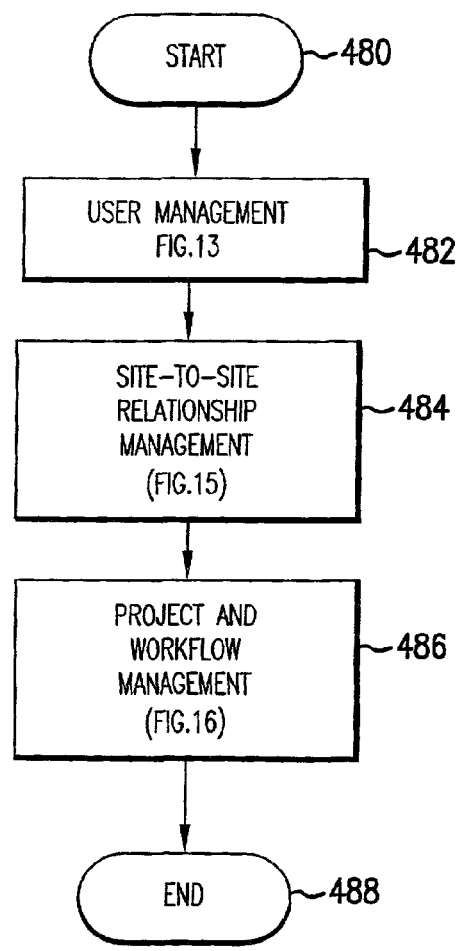
FIG. 12 is a flowchart illustrating the globalization management process of the present invention.

In FIG. 12, there is shown the flow chart associated with the global resource management process. The process contains three steps, user management in block 482, site relationship management in block 484, and project and work flow management in block 486. From block 486, the flow passes to block 488, wherein the process flow is returned to block 364 of FIG. 6. The processes involved in each of the three steps of blocks 482, 484 and 486 are further detailed in FIGS. 13, 15 and 16, respectively.

Figure 13:
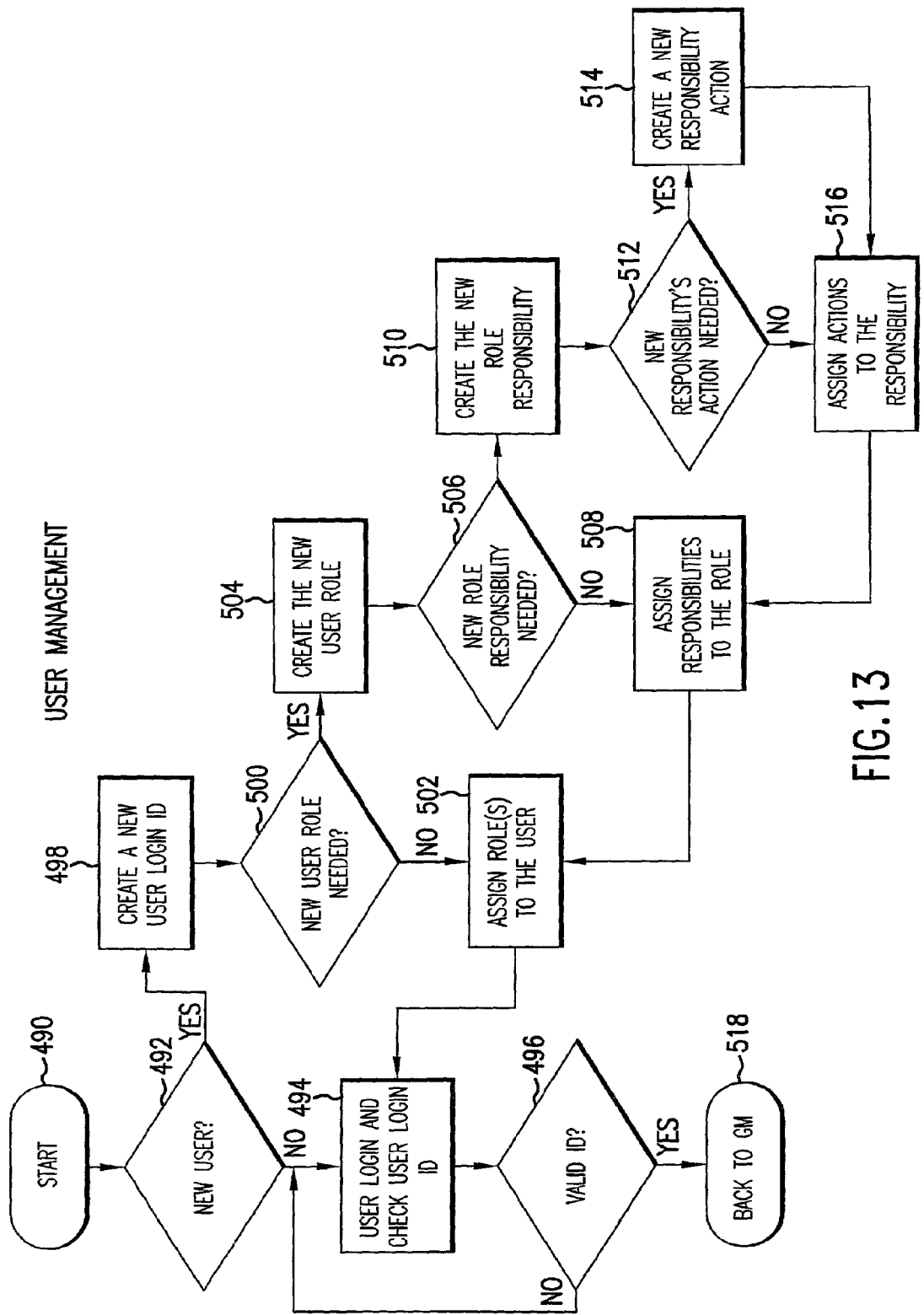
FIG. 13 is a flowchart illustrating the user management process of the present invention.

The user management process is shown in FIG. 13. From the start block 490, the flow passes to decision block 492 wherein it is determined whether the process is for a new user, or not. If it is not a new user, the flow passes to block 494 wherein the user logs in to the system and the user's identification is checked. From block 494, the flow passes to block 496 wherein it is determined whether the user's identification is valid. If it is not, flow passes back to block 494. If the user's identification is valid, the flow then passes to block 518, wherein the process is returned to block 482 of FIG. 12.

If in block 492 it is determined that the user is a new user, the flow passes to block 498 wherein a new user login identification is created. From block 498, the flow passes to decision block 500 wherein it is determined whether a new user role is needed. The user's role has to do with their responsibility associated with the user's system. For instance, the user's role may be management of a particular one of multiple web sites, or the particular user may be the administrator for all of the user's web sites. Other roles include engineer, developer, translator, workflow administrator, system administrator, project manager, etc. If a new user role is not needed, i.e. a predefined role is to be used, the flow passes to block 502, wherein the role is assigned to the user and then the flow passes to block 494 for the user's login to the system. If, however, a new user role is needed, the flow passes from decision block 500 to block 504 wherein the new user role is created. In creating a new role, the user gives the new role a name, such as "localization manager", and enters a detailed description of the role. From block 504, the flow passes to decision block 506 wherein it is determined whether new role responsibilities are needed. For some roles, responsibilities have been predetermined, however, where responsibilities of the user differ from those already identified, the other responsibilities can be assigned to a particular role. If no adjustment to the responsibilities is required, the flow passes to block 508 wherein the predetermined responsibilities are assigned to the role and flow then passes to block 502. Where new responsibilities are required, the flow passes to block 510 wherein the new role responsibilities are created. From block 510, the flow passes to decision block 512 wherein it is determined whether new actions need to be associated with a particular responsibility. Actions are essentially privileges that the user may be granted for accessing the system, creating or updating a web site, creating or updating just one page of a web site, or any other action that would be associated with a particular user management role. Therefore, if no additional actions over those which have been predetermined for particular responsibility are required, the flow passes to block 516 wherein those predetermined actions are assigned to the particular responsibility of the user and the flow then passes to block 508. If, however, new actions are required, then the flow passes to block 514 wherein those actions are created for the particular responsibility and then flow passes to block 516.

Figure 14:
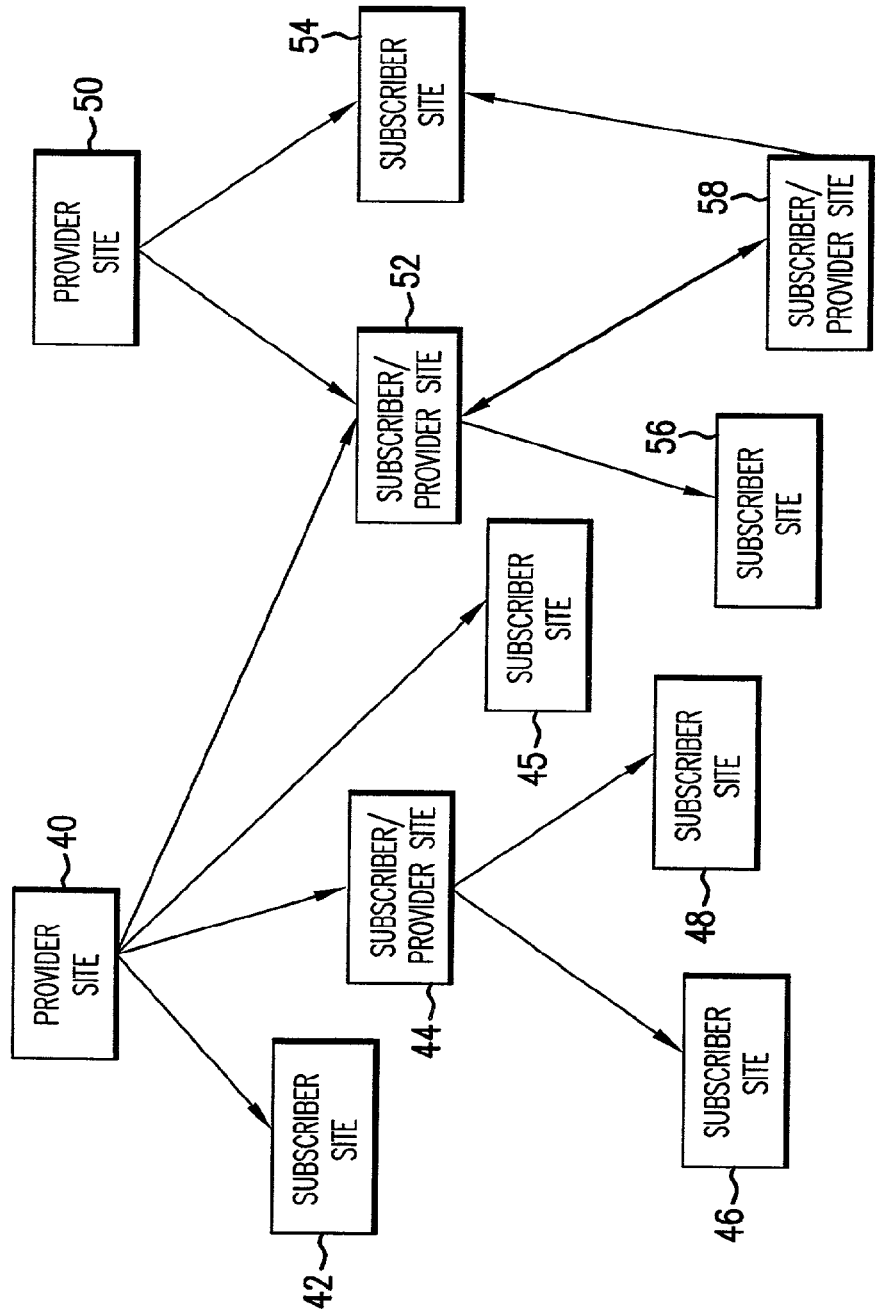
FIG. 14 is a schematic diagram illustrating a provider and subscriber model for user with the present invention.

Before discussing the site-to-site relationship management process, it is believed that a review of a provider and subscriber model, like that shown in FIG. 14, may be beneficial. FIG. 14 depicts a hypothetical model for a large Corporation having a number of web sites worldwide. The Corporation has two main corporate level web sites 40 and 50 which are identified as providers of resources to many of the other sites 42, 44, 45, 52 and 54. A site 52 which may represent a manufacturing operation of the Corporation is a subscriber to both of the main corporate level sites 40 and 50, wherein the sites 42, 44 and 45 are subscribers of the corporate level site 40 and the site 54 is a subscriber of the site 50. The site 44 in addition to being a subscriber of resources from site 40 is also a provider to each of two other sites 46 and 48. The site of the manufacturing operation 52 is a provider to two other sites 56 and 58. Site 58 represents a Japanese operation of the Corporation, for example, and therefore some of the resources which are introduced into that site need to be reflected in the U.S. and European sites, for example. Therefore, the Japanese site 58 is also a provider site for the sites 52 and 54. Once a model of the relationships between the sites is established, the process for specifying the site-to-site relationships for the resource globalization process can be performed.

Figure 15:
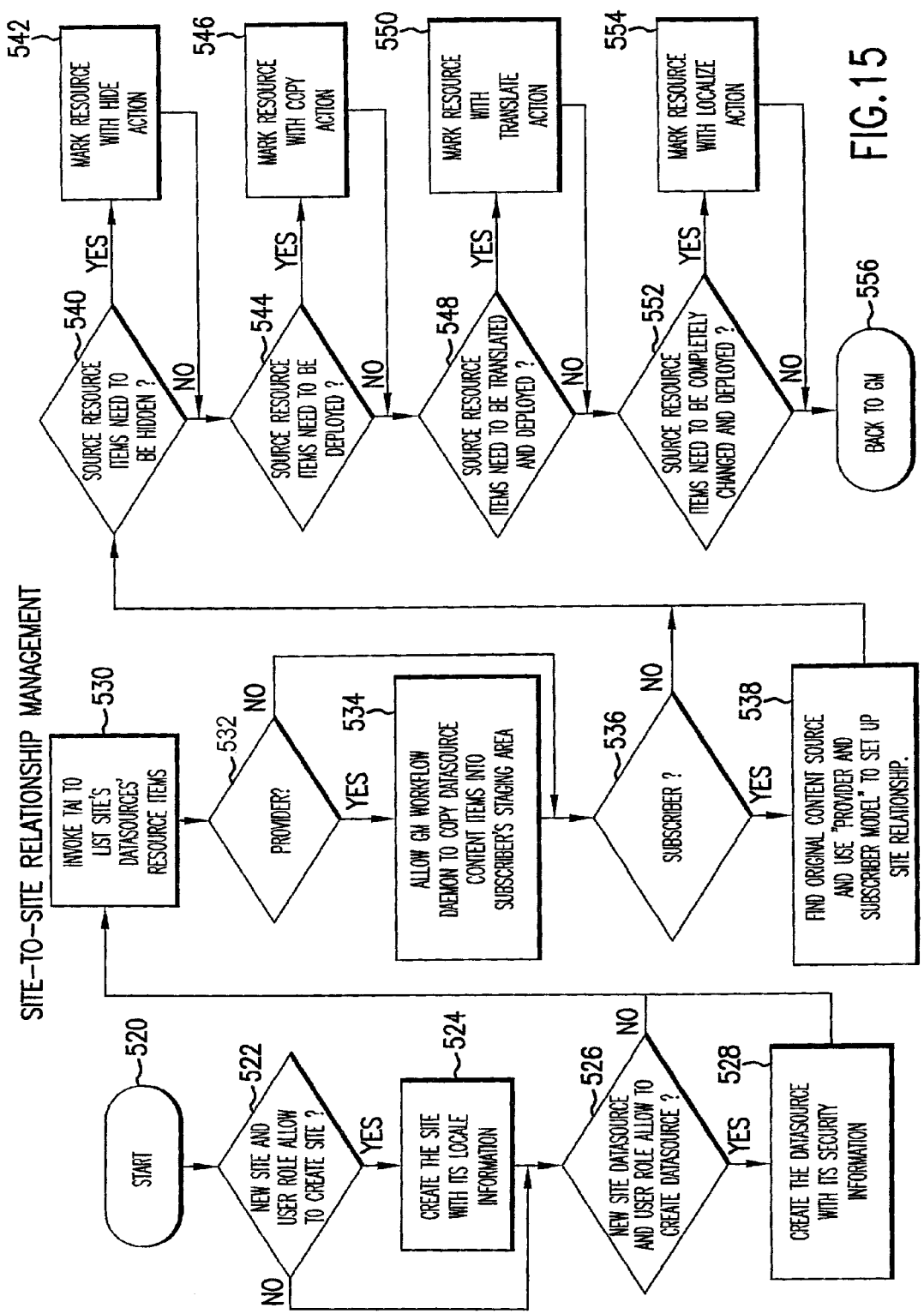
FIG. 15 is a flowchart illustrating the site-to-site relationship management process of the present invention.

Referring now to FIG. 15, there is shown a flow chart for the site-to-site relationship management process. From the starting point 520, the flow passes to decision block 522 wherein it is determined whether the user who has logged on has a role which allows them to create new sites. If they have such access rights, then the flow passes to block 524 wherein they create the site with its locale information. Locale has four components; language, territory, character coding, and sorting scheme. The character coding may vary with the language in which the page is presented. In the U.S., characters are encoded utilizing an ASCII coding. In the U.S., the sorting is usually done utilizing a dictionary sort routine, wherein upper case characters have precedence over lower case. The user can specify the sorting scheme in the site creation step. From block 524, the flow passes to decision block 526. If in decision block 522, the user does not have authority to create a site, then the flow from decision block 522 passes also to decision block 526. In decision block 526, it is determined whether the user has authority to create a data source. If the user does not have such authority, the flow passes to block 530. If the user does have the authority, the flow passes to block 528 wherein the data source and its associated security information are created. In block 528, the flow passes to block 530. In block 530, the user specifies the necessary information for the target application interface so that it can properly communicate with the data source. As previously discussed, the target application interface allows a transfer of files and folders between the globalization manager and the site's data source.

From block 530, the flow passes to decision block 532 wherein it is determined whether the site is to take on the role as a resource provider to other sites. If the site is to be a provider, then the flow passes to block 534. In block 534, the globalization manager workflow daemon copies the data items from the provider resource data source into the subscriber's staging area. From block 534, the flow passes to block 536. If the site is not a provider, then the flow passes from decision block 532 to decision block 536. Decision block 536 determines whether the site is a subscriber site. If it is not, the flow passes from block 536 to decision block 540. If the site is a subscriber site, then the flow passes to block 538. In block 538, the content sources are identified. In accordance with the provider/subscriber model utilized when the site was set up, the particular site may be a subscriber to multiple providers, and those linkages are identified for further processing. From block 538, the flow passes to decision block 540. In decision block 540, it is determined whether the source content items need to be hidden. If they do, flow passes to block 542 wherein the source contents are marked (flagged) with a HIDE action. From block 542, the flow passes to decision block 544. If the source content items do not require hiding, then the flow passes directly from decision block 540 to decision block 544. In decision block 544, it is determined whether the source content data items can be directly copied to the target site without modification. If it can, then the flow passes to block 546 wherein the contents are marked with a COPY action. From block 546, the flow passes to decision block 548. If in decision block 544, the data items could not be directly copied, then the flow also passes to decision block 548. In decision block 548, it is determined whether the data items need to be translated. If they do, the flow passes to block 550 wherein the data items are marked with a TRANSLATE action. From block 550, the flow passes to decision block 552, as does the flow from decision block 548 where the data items do not require translation. In block 552, it is determined whether the data items need to be changed before they are copied. If they do, then the flow passes to block 554 wherein the data items are marked with a LOCALIZE action. From block 544, the flow passes to block 556. If the data items did not require modification prior to copying, then the flow from block 552 passes to block 556, wherein the process passes back to block 484 of FIG. 12. Note that Hide, Copy, Localize, and Translate are examples of business rules. Any other business rules, such as Search and Replace, can be incorporated into the process steps discussed in preceding paragraphs.

Figure 16:
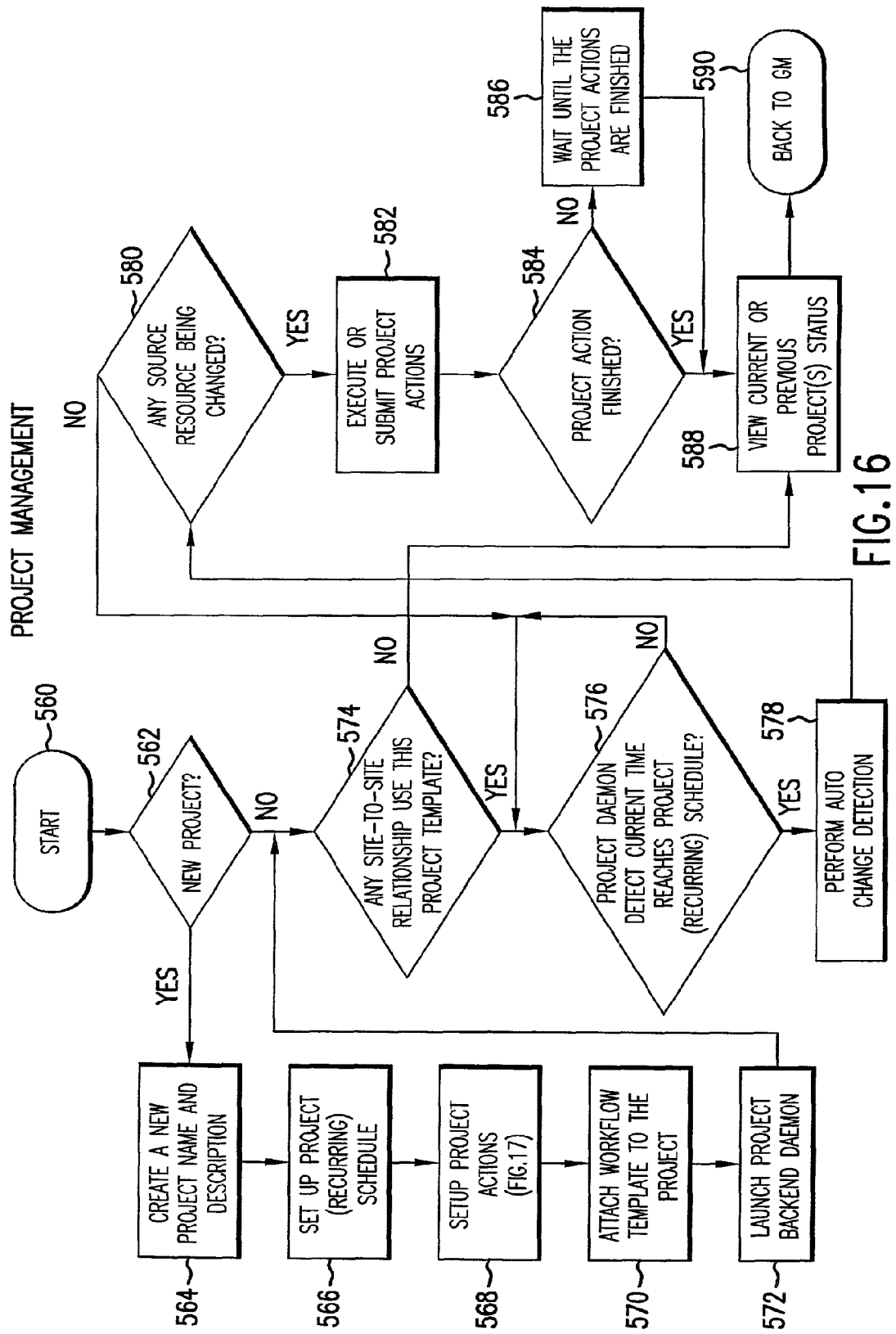
FIG. 16 is a flowchart illustrating the project management process of the present invention.

In FIG. 16, the flow chart for the project management process is shown. From the start block 560, the flow passes to decision block 562 wherein it is determined whether or not a new project is being processed. If a new project is being processed, the flow passes from block 562 to block 564. In block 564, a new project name and description is created. Flow passes then from block 564 to block 566 wherein a recurring project schedule is set up. From block 566, the flow passes to block 568, wherein the project actions are set up. The process of setting up project actions will be further described in following paragraphs. From block 568, the flow passes to block 570 wherein a workflow template is identified with the project. The workflow template is an identification of the process steps needed for the project including identification of vendors for providing translation and review services. From block 570, the flow passes to block 572 wherein the workflow daemon is launched to automatically handle the workflow process. From block 572, the flow then passes to decision block 574. If in block 562, the project was not identified as a new project, then the flow from decision block 562 would also flow to decision block 574.

In decision block 574, it is determined whether the site-to-site relationships have been assigned to the particular project. If it has not, the flow passes to block 588. If the site-to-site relationships have been defined, then the flow passes to decision block 576. In decision block 576 it is determined whether the project daemon has detected that the current time coincides with a scheduled resource change detection time period of the project schedule. If it has not, this test is repeated until concurrence of the current time with the scheduled change detection schedule occurs. When concurrence is detected, the flow passes from block 576 to block 578. In block 578, the automatic detection of a resource change of the provider data source is performed and then flow passes to decision block 580. In block 580, it is determined whether there has been a change in the source content. If no change is detected, the flow then passes back to decision block 576 to repeat the sequence at the next scheduled time period. If, however, a change is detected, the flow passes from decision block 580 to block 582. In block 582, the project actions are executed to appropriately transfer the resource, either directly, translated, or localized, from the source to the subscriber. From block 582, the flow passes to decision block 584 wherein it is determined whether the project action has been completed. If it has not, then the flow passes to block 586 wherein the process is put on hold until the project actions have been completed. From block 586, the flow passes to block 588, as does the flow from decision block 584 if it is determined therein that the project action had finished. In block 588, the user is able to view the current or previous project status. From block 588, the flow passes to block 590, which transfers the flow back to block 486 of FIG. 12.

Figure 17:
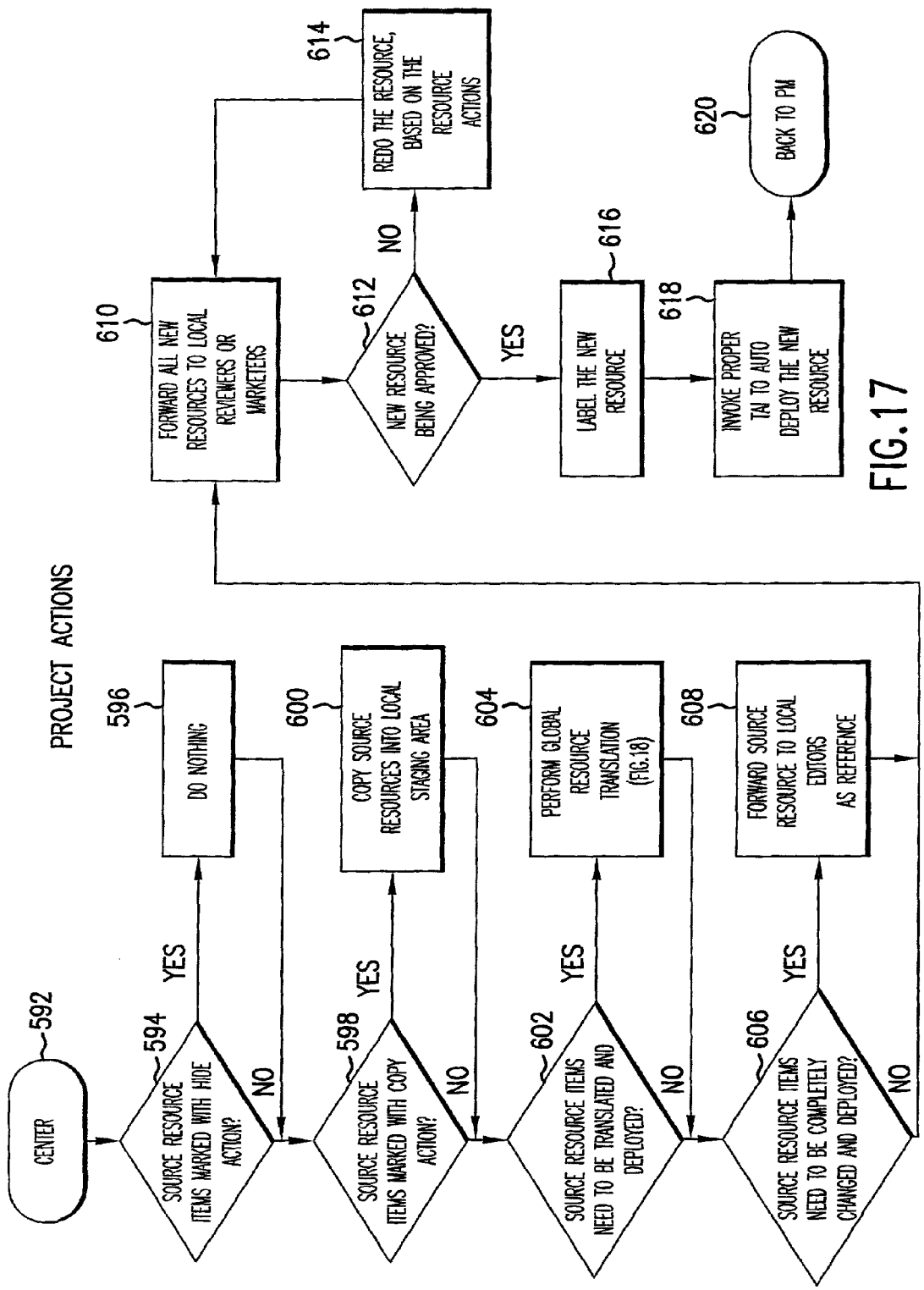
FIG. 17 is a flowchart illustrating the project action process of the present invention; and, FIG. 18 is a flowchart illustrating the global resource translation process of the present invention.

The process in setting up project actions is illustrated in FIG. 17. From the start block 592, the flow passes to decision block 594 wherein it is determined whether the source content data items are marked with a HIDE action. If they are, flow passes to block 596, which essentially transfers the flow to decision block 598 without taking any action. If the source content data items are not marked with a HIDE action, the flow also passes to decision block 598, wherein it is determined whether the source content data items are marked with a COPY action. If they are marked with a COPY action, then the flow passes to block 600 wherein the source content is copied into the local staging area of the target site. From block 600, the flow then passes to decision block 602, as does the flow from block 598 if the source content data items are not marked with a COPY action. In decision block 602, it is determined whether the source content data items need to be translated prior to their deployment, transfer to the subscriber site. If translation is required, the flow passes to block 604 wherein the translation process is undertaken. Subsequent to completion of the translation process, the flow passes from block 604 to decision block 606. If translation was not required, then the flow from decision block 602 then passes to decision block 606, as well. Decision block 606 determines whether the source content data items need to be changed (localized) and deployed. If change is required, the flow passes to block 608, wherein the source content data items are sent to local content editors who perform the localization necessary for the locale associated with the web site. If the source does not require modification, the flow passes from decision block 606 to block 610, as does the flow from block 608. In block 610, the new contents is forwarded to local reviewers or marketers to insure the content is proper for the locale. From block 610, the flow passes to decision block 612 wherein it is determined whether the local reviewers or marketers have approved the new contents. If they have not approved those contents, flow passes to block 614, wherein the contents are further modified in accordance with the requirements of the reviewers or marketers and then the flow passes back to block 610. If it is determined that the new contents have been approved, then the flow passes from block 612 to block 616. In block 616, the new content is labeled as such. From block 616, the flow passes to block 618. In block 618, the appropriate target application interface is initiated to insert the new content into the target space. From block 618, the flow passes to block 620 wherein the process passes back to block 568 of FIG. 16.

Figure 18:
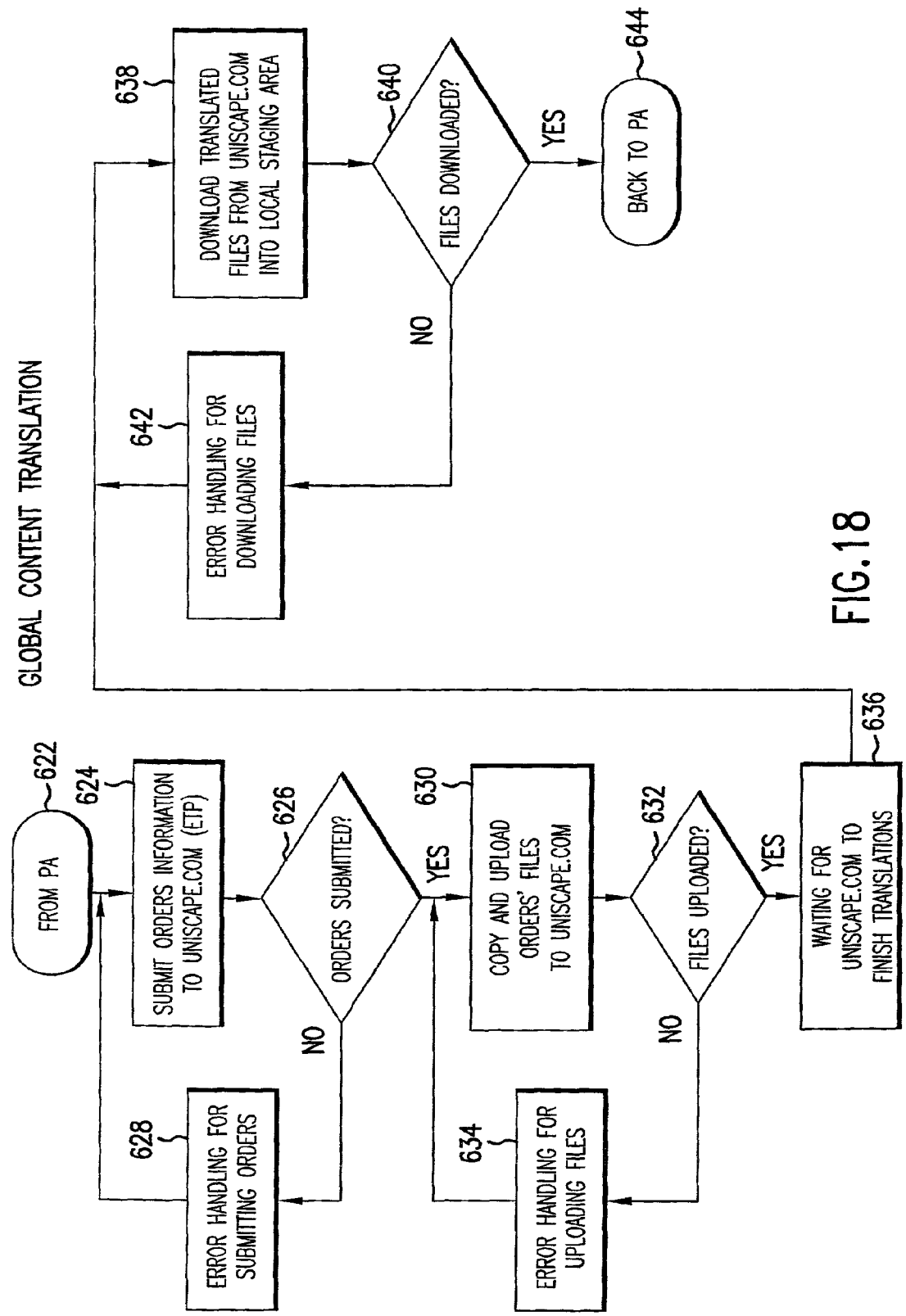

Turning now to FIG. 18, there is shown a flow chart for the global resource translation process. From the starting point of block 622, the flow passes to block 624. In block 624, the project daemon automatically creates the ordering information and submits such to the electronic translation portal. From block 624, the flow passes to decision block 626, wherein it is determined whether the order had been submitted. If the order was not submitted, the flow passes to block 628, wherein order submission error handling procedures are carried out. From block 628, the flow passes back to block 624. If it is determined in decision block 626 that the order has been submitted, then the flow passes to block 630 wherein the files to be translated are copied and uploaded to the electronic translation portal. From block 630, the flow passes to decision block 632, wherein it is determined whether the files have been uploaded. If the uploading has not occurred, the flow passes to block 634, wherein the file uploading error handling procedures are carried out. From block 634, the flow passes back to block 630. If the files have been successfully uploaded, then the flow passes from decision block 632 to block 636. In block 626, the process is put on hold until the electronic translation portal indicates that the translations have been completed. From block 636, the flow passes to block 638 wherein the translated files are downloaded from the electronic translation portal into a local staging area. From block 638, the flow passes to the decision block 640. Decision block 640 determines whether the files have been successfully downloaded. If they have not, the flow passes to block 642 wherein error handling procedures for downloading files is carried out. From block 642, the flow passes back to block 638. If decision block 640 determines that the files have been successfully downloaded, the flow then passes to block 644 wherein the process is returned to block 604 of FIG. 17.

Although this invention has been described in connection with specific forms and embodiments thereof, it will be appreciated that various modifications other than those discussed above may be resorted to without departing from the spirit or scope of the invention. For example, equivalent elements may be substituted for those specifically shown and described, certain features may be used independently of other features, and in certain cases, particular locations of elements may be reversed or interposed, all without departing from the spirit or scope of the invention as defined in the appended Claims.

What is claimed is:

1. A globalization management system for managing resources of a plurality of interrelated websites accessed through a communications network, the system comprising:
    a memory for storing executable instructions;
    a processor for executing the instructions; and
    a globalization manager engine stored in memory and executable by the processor, the globalization manager engine communicatively couplable, via a plurality of target application interfaces, with a plurality of web servers that serve the plurality of interrelated websites, said globalization manager engine including (a) a website-to-website relationship manager module for identifying provider and subscriber website relationships, language translation, and localization requirements between the plurality of interrelated websites, (b) a data manager for determining current content from provider websites by said website-to-website relationship manager, (c) an analysis module for comparing said data representing current content with data representing prior content to identify content changes at a respective provider website, and (d) a project manager module for transferring said data identified as a content change to at least one subscriber site.

2. A method for managing a global network of interrelated websites, the method comprising:
    determining base content included in each of a plurality of interrelated websites;
    detecting a change in at least a portion of the base content for a provider website;
    determining a relationship between the provider website and at least one subscriber website;
    updating content for the at least one subscriber website via a globalization manager engine that comprises memory for storing executable instructions for managing a global network of websites and a processor for executing the instructions, the global management engine updating the content by at least one or more of copying, translating, localizing, or combinations thereof, of the changed content; and
    providing the updated content, via the globalization manager engine, to the at least one subscriber website selectively and communicatively coupled with the globalization manager engine.

3. The method according to claim 2, wherein updating content for the subscriber website is based upon locale information for the subscriber website, wherein the locale information defines any of a language, a territory, a character coding, a sorting scheme, or combinations thereof for the subscriber website.

4. The method according to claim 1, further comprising modifying a database associated with the subscriber website to a Unicode database before the step of updating.

5. The method according to claim 1, further comprising establishing at least one subscriber/provider relationship between at least two of the plurality of interrelated websites.

6. The method according to claim 5, wherein the subscriber/provider relationship comprises links between content of the at least two of the plurality of interrelated websites.

7. The method according to claim 1, wherein providing comprises uploading the updated content to a staging area associated with a legacy content management system used to maintain the subscriber website.

8. The method according to claim 1, further comprising determining at least one legacy content management system associated with the at least one subscriber website, wherein the updated content is provided to the at least one legacy content management system in a file format utilized by the at least one legacy content management system.

9. A system for managing a global network of websites, the system comprising:
   a memory for storing executable instructions;
   a processor for executing the instructions; and
   a globalization manager engine that is stored in the memory and executable by the processor to:
      determine base content included in each of a plurality of interrelated websites;
      evaluate the plurality of interrelated websites to determine a change in at least a portion of the base content for a provider website,
      wherein if the globalization manager engine determines a change in at least a portion of the base content for a provider website, the globalization manager engine then determines a relationship between the provider website and at least one subscriber website;
      update content for the at least one subscriber website by at least one or more of copying, translating, localizing, or combinations thereof, of the changed content; and
      provide the updated content to the at least one subscriber web server that hosts the subscriber website.

10. The system according to claim 9, wherein the globalization manager engine updates content for the subscriber website based upon locale information for the subscriber website, wherein the locale information defines any of a language, a territory, a character coding, a sorting scheme, or combinations thereof for the subscriber website.

11. The system according to claim 10, wherein the globalization manager engine further modifies a database associated with the subscriber website to a Unicode database.

12. The system according to claim 9, wherein the globalization manager engine further establishes at least one subscriber/provider relationship between at least two of the plurality of interrelated websites.

13. The system according to claim 12, wherein the subscriber/provider relationship comprises links between content of the at least two of the plurality of interrelated websites.

14. The system according to claim 9, wherein the globalization manager engine transmits the updated content to a staging area associated with a legacy content management system used to maintain the subscriber website.

15. The system according to claim 9, wherein the globalization manager engine further determines at least one legacy content management system associated with the at least one subscriber website, wherein the globalization manager engine further transmits the updated content to the at least one legacy content management system in a file format utilized by the at least one legacy content management system.

16. The system according to claim 1, wherein each of said target application interfaces are respectively coupled to at least one web server serving at least one of the interrelated websites via the communications network, each of said target application interfaces configured to convert a protocol of a respective legacy content management system to a predetermined protocol and said predetermined protocol to said protocol of the respective legacy content management system.

* * * * *